(12) United States Patent
Mitarai et al.

(10) Patent No.: US 10,399,192 B2
(45) Date of Patent: Sep. 3, 2019

(54) MACHINERY INSTALLATION METHOD, MACHINERY INSPECTION METHOD, MACHINERY LINKAGE INSPECTION METHOD, AND SUPPORTING STRUCTURES

(71) Applicant: CHIYODA CORPORATION, Yokohama-shi, Kanagawa (JP)

(72) Inventors: Yasuhiro Mitarai, Yokohama (JP); Yongwoo Shin, Yokohama (JP)

(73) Assignee: CHIYODA CORPORATION, Yokohama-Shi, Kanagawa (JP)

( * ) Notice: Subject to any disclaimer, the term of this patent is extended or adjusted under 35 U.S.C. 154(b) by 258 days.

(21) Appl. No.: 15/235,231

(22) Filed: Aug. 12, 2016

(65) Prior Publication Data
US 2018/0043486 A1    Feb. 15, 2018

(51) Int. Cl.
| | | |
|---|---|---|
| *B65G 7/04* | (2006.01) |
| *F16M 1/00* | (2006.01) |
| *F25J 1/02* | (2006.01) |
| *F28F 9/00* | (2006.01) |

(Continued)

(52) U.S. Cl.
CPC ............ *B23P 19/04* (2013.01); *B23P 15/26* (2013.01); *F16M 1/00* (2013.01); *F25J 1/0259* (2013.01); *F25J 1/0262* (2013.01); *F28F 9/002* (2013.01); *B65G 7/04* (2013.01); *F25J 2290/42* (2013.01); *F28F 2265/16* (2013.01); *F28F 2275/20* (2013.01)

(58) Field of Classification Search
CPC ............ F28F 2280/06; F28F 2280/10; F28F 2280/08; F28F 9/002; F28F 2275/20; F28F 2265/16; F22B 37/24; F22B 37/242; Y10T 29/49387; B23P 19/04; B23P 15/26; F25J 1/0262; F02C 7/20
USPC ...... 414/267; 254/90, 799, 545, 544; 29/799, 29/793, 794, 822; 52/169.7, 169.8, 223.2, 52/223.3; 248/545, 544, 649, 651, 669, 248/671, 672
See application file for complete search history.

(56) References Cited

U.S. PATENT DOCUMENTS

| | | | | |
|---|---|---|---|---|
| 3,048,280 A | * | 8/1962 | Huff ...................... | B23P 19/024 165/78 |
| 3,126,103 A | * | 3/1964 | Postelwaite et al. ........ | B23P 19/024 254/30 |

(Continued)

FOREIGN PATENT DOCUMENTS

| | | |
|---|---|---|
| CN | 204852797 U | 12/2015 |
| JP | S5835208 A | 3/1983 |

(Continued)

OTHER PUBLICATIONS

GCC First Office Action corresponding to Application No. 33825; dated May 28, 2019.

*Primary Examiner* — Jason L Vaughan
(74) *Attorney, Agent, or Firm* — Cantor Colburn LLP (57) ABSTRACT

A supporting structure that supports a heat exchanger having a saddle is provided. The supporting structure includes a first supporting structure for supporting the saddle along one end thereof and a second supporting structure for supporting the saddle along another end thereof. The first supporting structure and the second supporting structure are situated spaced apart from each other by at least a distance enabling passage of a transporter for transporting the heat exchanger.

7 Claims, 12 Drawing Sheets

(51) Int. Cl.
*B23P 15/26* (2006.01)
*B23P 19/04* (2006.01)

(56) References Cited

U.S. PATENT DOCUMENTS

| | | | | |
|---|---|---|---|---|
| 3,180,498 A * | 4/1965 | Postlewaite | ........... | B23P 19/024 254/106 |
| 3,239,076 A * | 3/1966 | Huff | ........... | B23P 19/024 254/29 R |
| 3,239,077 A * | 3/1966 | Huff | ........... | B23P 19/024 254/100 |
| 3,257,001 A * | 6/1966 | Postlewaite | ........... | B23P 19/024 254/100 |
| 3,510,012 A * | 5/1970 | Van Meteren | ........ | B23P 19/024 254/105 |
| 3,567,044 A * | 3/1971 | Travis | ........... | B23P 19/024 254/105 |
| 3,658,191 A * | 4/1972 | Murphy | ........... | B23P 19/024 212/167 |
| 3,747,789 A * | 7/1973 | Shipley | ........... | B66F 9/10 414/633 |
| 3,765,544 A * | 10/1973 | Murphy | ........... | B23P 19/024 212/231 |
| 3,836,015 A * | 9/1974 | Travis | ........... | B23P 19/024 254/105 |
| 3,935,951 A * | 2/1976 | Claus | ........... | B23P 19/024 29/726.5 |
| 3,954,187 A * | 5/1976 | van der Woerd | ..... | B23P 19/024 29/726.5 |
| 3,958,698 A * | 5/1976 | van der Woerd | ..... | B23P 19/024 414/745.3 |
| 4,053,062 A * | 10/1977 | Travis | ........... | B23D 19/02 254/105 |
| 4,125,928 A * | 11/1978 | Cawley | ........... | B23P 19/022 29/252 |
| 4,227,854 A * | 10/1980 | Coffey | ........... | B23P 19/022 29/726.5 |
| 4,323,398 A * | 4/1982 | Simon | ........... | F28G 15/02 134/18 |
| 4,358,242 A * | 11/1982 | Davies | ........... | B23P 19/024 29/726.5 |
| 4,440,265 A * | 4/1984 | Spagnoli | ........... | B64F 5/50 182/129 |
| 4,502,392 A * | 3/1985 | Rosenberger | ........... | F28D 7/085 105/360 |
| 4,869,638 A * | 9/1989 | Krajicek | ........... | B23P 19/024 414/745.3 |
| 5,032,054 A * | 7/1991 | Krajicek | ........... | B23P 19/024 29/726.5 |
| 5,228,191 A * | 7/1993 | Casterline | ........... | B23P 19/024 29/726 |
| 5,322,410 A * | 6/1994 | Persinger | ........... | B23P 19/024 29/726.5 |
| 5,323,529 A * | 6/1994 | Amuny | ........... | B23P 19/024 29/723 |
| 5,841,147 A * | 11/1998 | Steinke | ........... | G21F 5/14 250/507.1 |
| 6,793,458 B2 * | 9/2004 | Kawai | ........... | F01D 25/28 248/671 |
| 8,057,607 B2 * | 11/2011 | Gardner | ........... | B08B 9/04 134/166 C |
| 9,612,063 B2 * | 4/2017 | Reich | ........... | B23P 19/024 |
| 2004/0060302 A1* | 4/2004 | Kuroki | ........... | F01D 25/285 60/797 |
| 2005/0150095 A1* | 7/2005 | Ashar | ........... | F01D 25/285 29/426.3 |

FOREIGN PATENT DOCUMENTS

JP         S597804 A       1/1984
JP         2001-304785      10/2001

\* cited by examiner

MACHINERY INSTALLATION METHOD, MACHINERY INSPECTION METHOD, MACHINERY LINKAGE INSPECTION METHOD, AND SUPPORTING STRUCTURES

BACKGROUND OF THE INVENTION

1. Field of the Invention

The present invention relates to methods of installing and methods of inspecting heat exchangers, for example, and like machinery, to methods of inspecting machinery linkages, and to machinery supporting structures.

2. Description of the Related Art

In liquefied natural gas plants, a number of large-scale heat exchangers (for example, four) are employed linked together in a train. To date, when heat exchangers have been installed or when they have been inspected, a large-scale crane has been used to place the heat exchangers on bases, hydraulic jacks, block and tackle, or like equipment has been used to manually shift the heat exchangers on their bases so as to bring them into alignment with each other, and the machinery's plumbing has been hooked up (reference is made to, for example, Patent Document 1).

Patent Document 1: JP 2001-304785

Using large-scale cranes to move the heat exchangers, or using hydraulic jacks, block and tackle, or like equipment to manually shift heat exchangers on their bases so as to bring them into alignment with each other has required enormous labor and time.

SUMMARY OF THE INVENTION

An object of the present invention, brought about taking such circumstances into consideration, is to make available technology that enables installing as well as inspecting large-scale machinery such as heat exchangers easily and in a short period of time.

To achieve the object described above, one embodiment of the present invention relates to a method of installing machinery having a saddle. The machinery installation method includes: a step of situating a first supporting structure for supporting a first the saddle along one end thereof; a step of situating a second supporting structure for supporting the saddle along another end thereof, spaced apart from the first supporting structure by at least a distance enabling passage of a conveyance means for transporting the machinery; a step of causing the conveyance means, having been loaded with the machinery, to shift passing between the first supporting structure and the second supporting structure; a step of setting, employing the conveyance means, the machinery saddle onto the first supporting structure and the second supporting structure; and a step of anchoring the saddle to the first supporting structure and the second supporting structure.

The machinery installation method may further include: a step of placing shim plate(s) on the first supporting structure and/or the second supporting structure in order to adjust the machinery height; and a step of setting, employing the conveyance means, the machinery saddle on the shim plate(s).

The machinery installation method may further include: a step of placing interface members on the first supporting structure and the second supporting structure; and a step of setting, using the conveyance means, the machinery saddle on the interface members.

The machinery installation method may further include a step of anchoring, using fastening members, the interface members to the saddle.

The machinery installation method may further include a step of inserting between the saddle and the interface members a shim plate for adjusting the machinery height.

Another embodiment of the present invention relates to a method of inspecting machinery having a saddle. The machinery is supported by a first supporting structure supporting the saddle along one end thereof and by a second supporting structure supporting the saddle along another end thereof. The first supporting structure and the second supporting structure are situated spaced apart from each other by at least a distance enabling passage of a conveyance means enabled for adjusting machinery position. The machinery inspection method includes: a step of shifting the conveyance means to pass it between the first supporting structure and the second supporting structure and dispose it under the machinery; a step of shifting the machinery, using the conveyance means; a step of inspecting the machinery; and a step, post-inspection completion, of setting, using the conveyance means, the machinery saddle on the first supporting structure and the second supporting structure.

Still another embodiment of the present invention relates to a method of inspecting linkages between first machinery and second machinery having saddles. The first machinery and the second machinery are each supported by a first supporting structure supporting the saddle along one end thereof and by a second supporting structure supporting the saddle along another end thereof. The first supporting structure and the second supporting structure are situated spaced apart from each other by at least a distance enabling passage of a conveyance means enabled for adjusting machinery position. The linkage inspection method includes: a step of shifting the conveyance means to pass it between the first supporting structure and the second supporting structure and dispose it under the machinery; a step of releasing the linkages between the first machinery and the second machinery; a step of parting the first machinery away from the second machinery, using the conveyance means; a step of inspecting respective linkage elements on the first machinery and the second machinery; a step, post-inspection completion, of aligning the first machinery with respect to the second machinery, using the conveyance means; and a step of coupling the first machinery and the second machinery.

Yet another embodiment of the present invention relates to a supporting structure that supports machinery having a saddle. The supporting structure includes: a first supporting structure for supporting the saddle along one end thereof; and a second supporting structure for supporting the saddle along another end thereof. The first supporting structure and the second supporting structure are situated spaced apart from each other by at least a distance enabling passage of a conveyance means for transporting the machinery.

The supporting structure may further include shim plate(s), placed on the first supporting structure and/or the second supporting structure, for adjusting the machinery height.

The supporting structure may further include interface members, placed on the first supporting structure and the second supporting structure, for carrying the machinery saddle.

The supporting structure may further include a fastening member for anchoring the interface members to the saddle.

The supporting structure may further include a shim plate, inserted between the saddle and the interface members, for adjusting the machinery height.

Arbitrary combinations of the elements described above and conversions of the expressions of the present invention between, for example, methods, apparatuses, and systems are also valid as aspects of the present invention.

DETAILED DESCRIPTION OF THE INVENTION

Exemplary embodiments of the present invention will be described below. The same reference sign will be given to the same or substantially the same constituents, members, and processes, and redundant description will be omitted as appropriate. The exemplary embodiments are described as examples and do not limit the invention. All features of the described exemplary embodiments and the combinations thereof are not necessarily essential to the invention.

Figure 1:
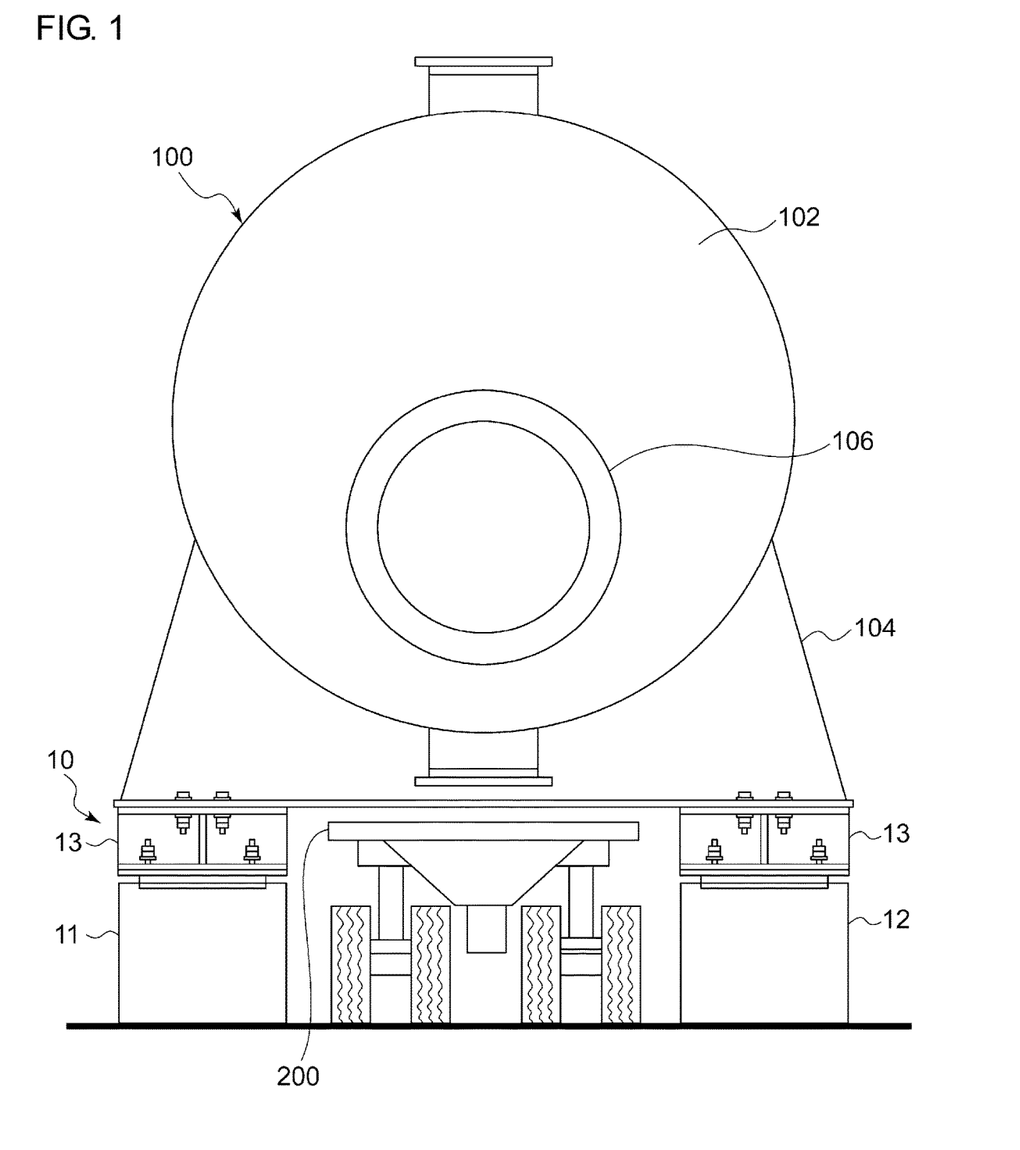
FIG. 1 is a schematic elevational view of a supporting structure according to an exemplary embodiment of the present invention.
Figure 2:
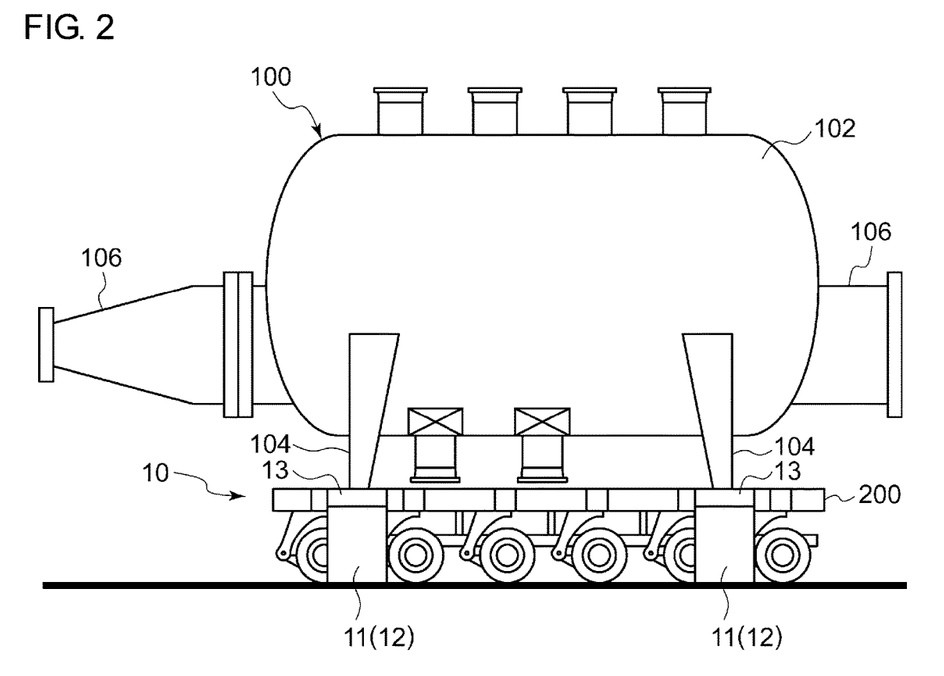
FIG. 2 is a schematic lateral view of the supporting structure according to an exemplary embodiment of the present invention.

FIG. 1 is a schematic elevational view of one of supporting structures 10 according to an exemplary embodiment of the present invention. FIG. 2 is a schematic lateral view of the supporting structures 10 according to the exemplary embodiment of the present invention.

The supporting structures 10 according to the present exemplary embodiment support a machinery having a saddle. The supporting structures that support a heat exchanger 100 will be described herein as an example.

The heat exchanger 100 is a horizontal heat exchanger and includes a body portion 102 having a substantially cylindrical shape, saddles 104 attached to a lower portion of the body portion 102, and pipes 106 respectively attached to the front and the back of the body portion 102.

The supporting structures 10 each include a first supporting structure 11 and a second supporting structure 12. The first supporting structure 11 supports the saddles 104 of the heat exchanger 100 along one end thereof, and the second supporting structure 12 supports the saddles 104 along another end thereof. In the present exemplary embodiment, the first supporting structure 11 and the second supporting structure 12 are concrete bases embedded in the ground.

As illustrated in FIG. 1, the first supporting structure 11 and the second supporting structure 12 are situated spaced apart from each other by at least a distance enabling passage of a transporter 200 as a conveyance means for transporting the heat exchanger 100. The transporter 200 is called a self-propelled modular transporter (SPMT), and is capable of moving and rotating in the up-down, right-left, and front-rear directions in a unit of several millimeters in a state of being loaded with large machinery such as the heat exchanger 100. In the case where the width of the transporter 200 is, for example, 2430 mm, the distance between the first supporting structure 11 and the second supporting structure 12 is, for example, about 3 m.

The supporting structures 10 each further include interface members 13 placed on the first supporting structure 11 and the second supporting structure 12. The interface members 13 are members for carrying the saddles 104 of the heat exchanger 100.

Figure 3:
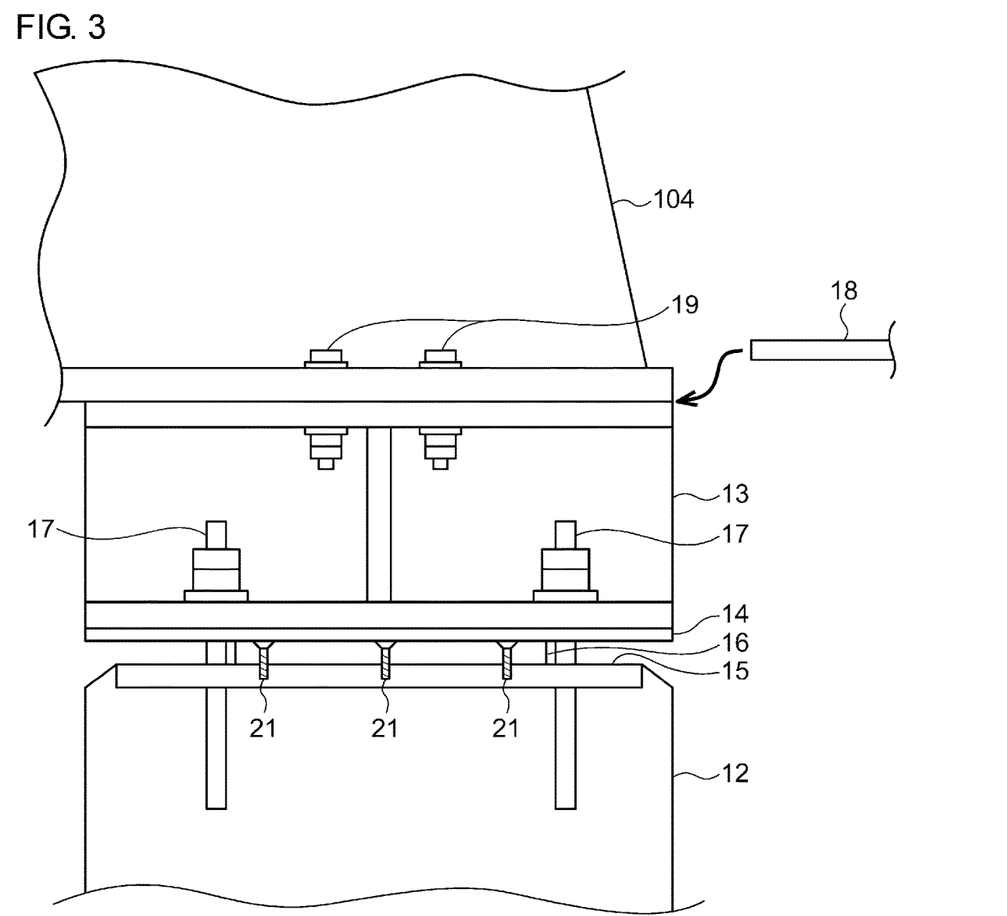
FIG. 3 is an enlarged view of the supporting structure and an interface member.

FIG. 3 is an enlarged view of the second supporting structure 12 and the interface members 13. Although the second supporting structure 12 is described herein as an example, the same applies to the case of the first supporting structure 11.

As illustrated in FIG. 3, the interface member 13 is a member formed in a hollow box shape. A first skid plate 14 is anchored via welding onto the lower surface of the interface member 13. In addition, a base plate 15 is anchored onto the second supporting structure 12, which is a concrete base, and a second skid plate 16 is anchored onto the base plate 15. Although the second skid plate 16 is anchored onto the base plate 15 via bolts 21 in the exemplary embodiment illustrated in FIG. 3, the second skid plate 16 may be anchored via welding. The interface member 13 is placed on the second supporting structure 12 such that the first skid plate 14 is in contact with the second skid plate 16. The contact surface between the first skid plate 14 and the second skid plate 16 is flat, and has a low coefficient of friction. The interface member 13 is anchored to the second supporting structure 12 via anchor bolts 17.

The saddles 104 of the heat exchanger 100 are each placed on the interface members 13. As illustrated in FIG. 3, shim plates 18 that each adjust the height of the heat exchanger 100 may be inserted between the saddles 104 and the interface members 13. The saddles 104 and the interface members 13 (and the shim plates 18 if necessary) are anchored to each other via setting bolts 19 serving as fastening members. In the case of an exemplary embodiment not provided with the interface members 13, the shim plates 18 may be placed on the first supporting structure 11 and/or the second supporting structure 12, and the saddles 104 of the heat exchanger 100 may be placed on the shim plates 18.

As described above, in the present exemplary embodiment, the supporting structure 10 is divided into the first supporting structure 11 and the second supporting structure 12 such that the transporter 200 can shift passing therebetween. This allows performing the following in installation of the heat exchanger 100: the transporter 200 loaded with the heat exchanger 100 is caused to move directly to a predetermined installation position through the space between the first supporting structure 11 and the second supporting structure 12; the saddles 104 are each placed on the first supporting structure 11 and the second supporting structure 12 by lifting the heat exchanger 100 with the transporter 200 thereafter; and a fine adjustment of the positions of the saddles 104 is performed. In addition, at the time of inspecting the heat exchanger 100, the heat exchanger 100 can be detached by using the transporter 200 after causing the transporter 200 to move to be positioned under the heat exchanger 100 through the space between the first supporting structure 11 and the second supporting structure 12. With this configuration, the installation of the heat exchanger 100 can be finished more easily and in a shorter period of time than the conventional case where a heat exchanger is moved and the position thereof is adjusted by using a large crane, a hydraulic jack, a chain block, or the like. Moreover, the supporting structures 10 of the present exemplary embodiment eliminate the requirement of pulling up the large heat exchanger 100 with a large crane, and thus the installation can be improved also in terms of safety.

In the present exemplary embodiment, a configuration is adopted in which interface members 13 are placed on the first supporting structure 11 and the second supporting structure 12 and each of the saddles 104 is placed on the interface members 13 in place of being placed directly on the first supporting structure 11 and the second supporting structure 12. This configuration is advantageous in that the setting bolts 19 can be replaced more easily. If each of the saddles 104 is placed directly on the first supporting structure 11 and the second supporting structure 12 and is anchored thereto via the setting bolts 19, it will be difficult to insert or replace the setting bolts 19 unless the heat exchanger 100 is lifted. This requires enormous labor and time. By contrast, in the case where the interface members 13 are used as in the present exemplary embodiment, the setting bolts 19 can be inserted or replaced freely without lifting the heat exchanger 100. This facilitates the operation of inspection for maintenance.

Next, a method of installing a heat exchanger on a supporting structure according to the present exemplary embodiment will be described. A case of coupling two heat exchangers (a first heat exchanger and a second heat exchanger) will be described herein.

Figure 4A:
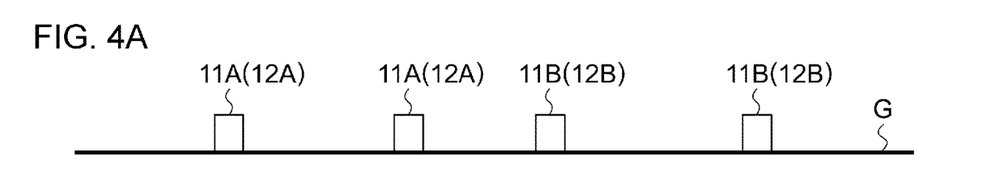
FIGS. 4A to 4C illustrate a first step of a method of installing heat exchangers.
Figure 4B:
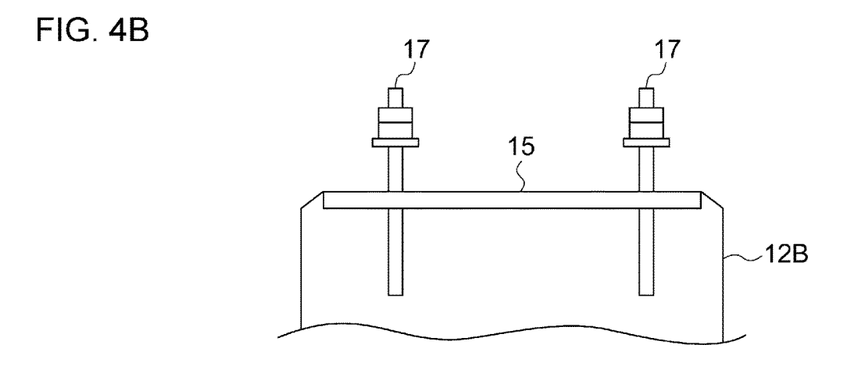
Figure 4C:
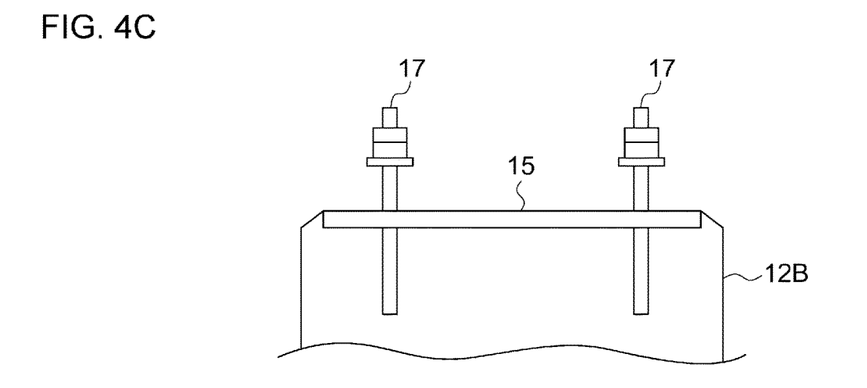

FIGS. 4A to 4C illustrate a first step of the method of installing the heat exchangers. FIG. 4A is a schematic side view illustrating the overall configuration in the first step. First, as illustrated in FIG. 4A, a first supporting structure 11A and a second supporting structure 12A for the first heat exchanger and a first supporting structure 11B and a second supporting structure 12B for the second heat exchanger are situated on the ground G. As described above, the first supporting structures and the second supporting structures are situated spaced apart from each other by at least a distance enabling passage of a transporter for transporting the heat exchanger. FIG. 4B is a front view of the second supporting structure 12B for the second heat exchanger in the first step, and FIG. 4C is a side view of the second supporting structure 12B for the second heat exchanger in the first step. Although the second supporting structure 12B for the second heat exchanger is illustrated herein as an example, the same applies to the other supporting structures. As illustrated in FIGS. 4B and 4C, the base plate 15 is anchored onto the second supporting structure 12B. In addition, the anchor bolts 17 are embedded in the second supporting structure 12B.

Figure 5A:
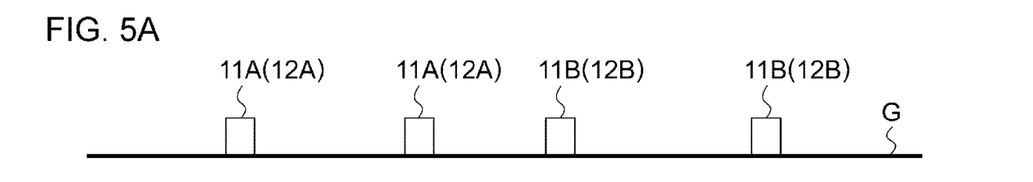
FIGS. 5A to 5C illustrate a second step of the method of installing the heat exchangers.
Figure 5B:
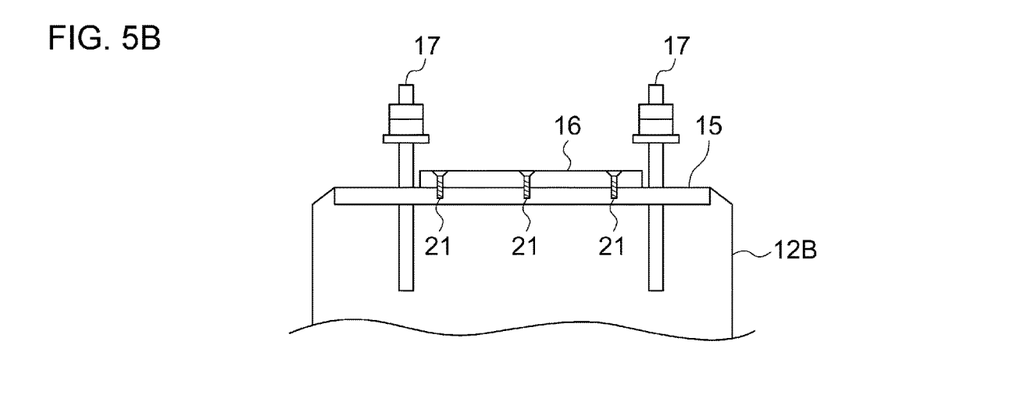
Figure 5C:
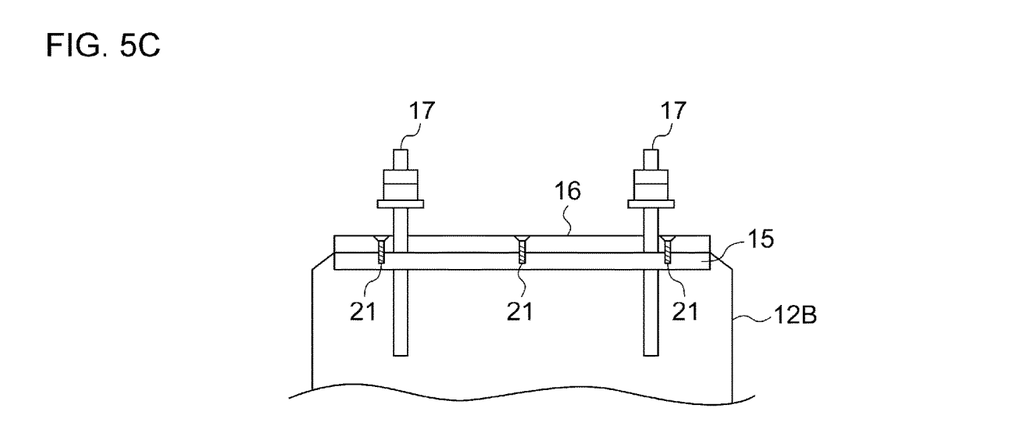

FIGS. 5A to 5C illustrate a second step of the method of installing the heat exchangers. FIG. 5A is a schematic side view illustrating the overall configuration in the second step. FIG. 5B is a front view of the second supporting structure 12B for the second heat exchanger in the second step, and FIG. 5C is a side view of the second supporting structure 12B for the second heat exchanger in the second step. In the second step, as illustrated in FIGS. 5B and 5C, the base plate 15 is anchored onto the second supporting structure 12B. Although the second skid plate 16 is anchored onto the base plate 15 via the bolts 21 in the present exemplary embodiment, the second skid plate 16 may be anchored via welding.

Figure 6A:
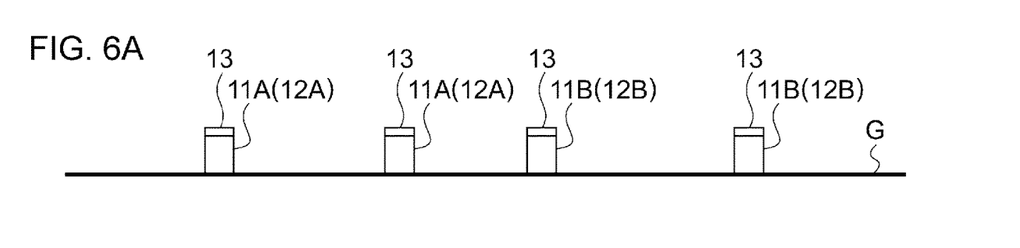
FIGS. 6A to 6C illustrate a third step of the method of installing the heat exchangers.
Figure 6B:
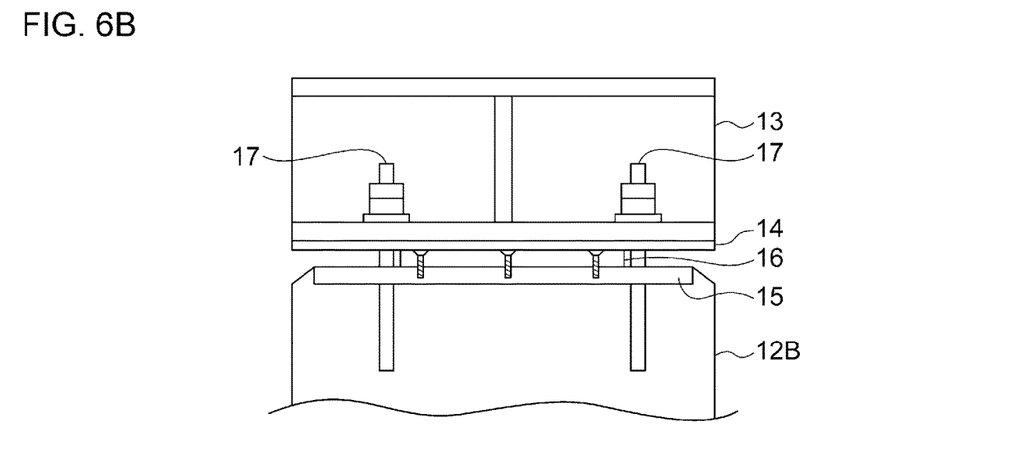
Figure 6C:
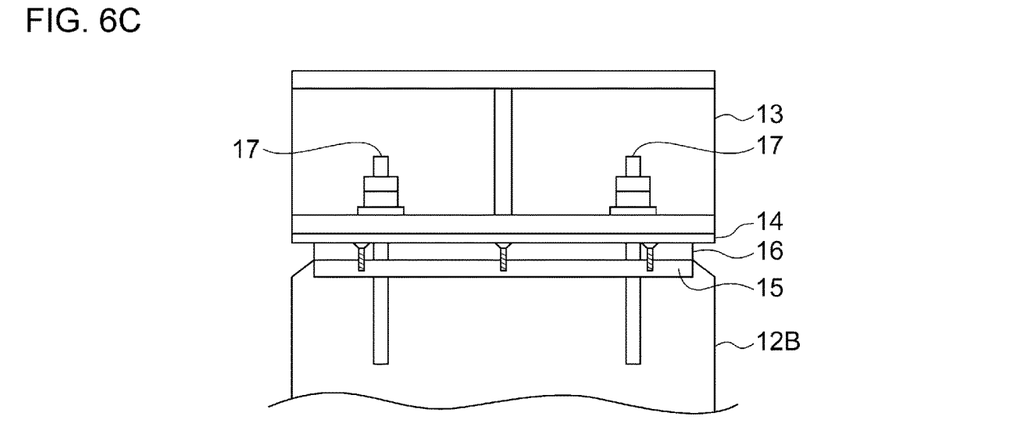

FIGS. 6A to 6C illustrate a third step of the method of installing the heat exchangers. FIG. 6A is a schematic side view illustrating the overall configuration in the third step. FIG. 6B is a front view of the second supporting structure 12B for the second heat exchanger in the third step, and FIG. 6C is a side view of the second supporting structure 12B for the second heat exchanger in the third step. In the third step, an interface member 13 with the first skid plate 14 welded onto the lower surface thereof is prepared and placed on the second supporting structure 12 such that the first skid plate 14 is in contact with the second skid plate 16. The interface member 13 is then anchored to the second supporting structure 12B by fastening the anchor bolts 17.

Figure 7A:
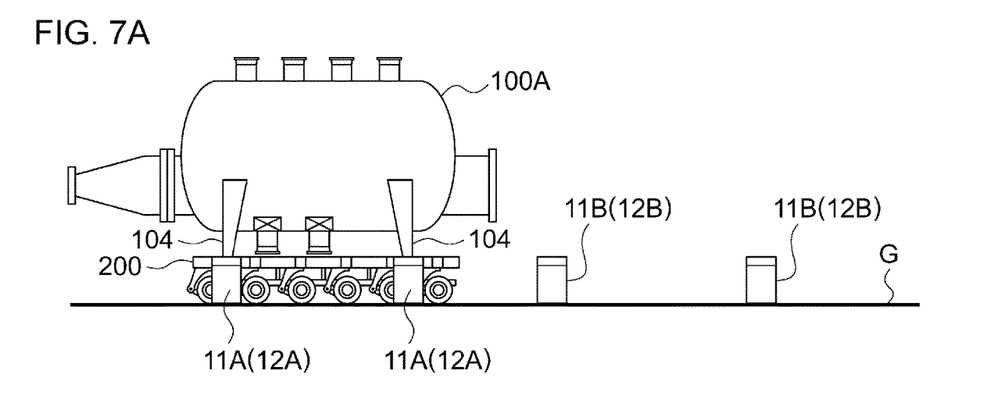
FIGS. 7A to 7C illustrate a fourth step of the method of installing the heat exchangers.
Figure 7B:
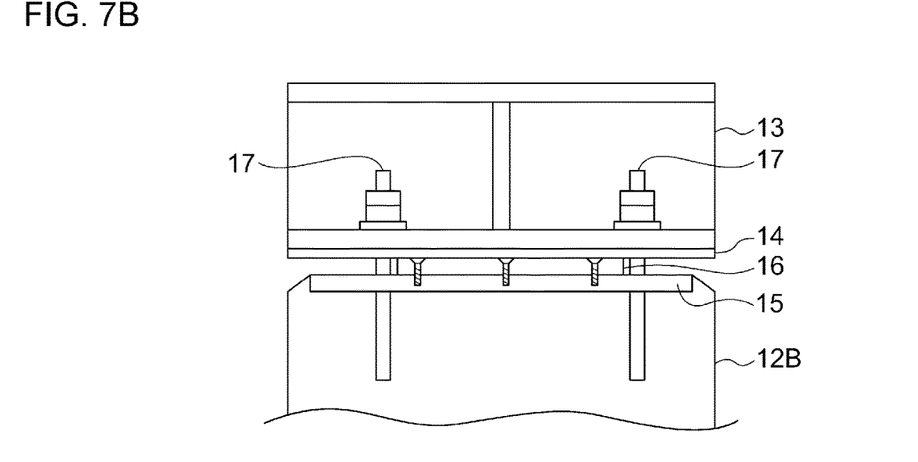
Figure 7C:
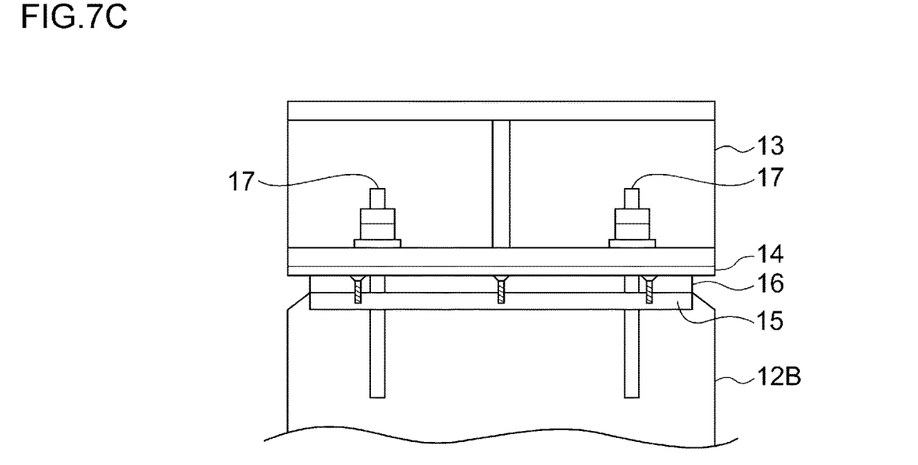

FIGS. 7A to 7C illustrate a fourth step of the method of installing the heat exchangers. FIG. 7A is a schematic side view illustrating the overall configuration in the fourth step. FIG. 7B is a front view of the second supporting structure 12B for the second heat exchanger in the fourth step, and FIG. 7C is a side view of the second supporting structure 12B for the second heat exchanger in the fourth step. In the fourth step, the first heat exchanger 100A is placed on the first supporting structure 11 and the second supporting structure 12 by using the transporter 200. The method of installation will be described in detail in the description of installation of the second heat exchanger 100B.

Figure 8A:
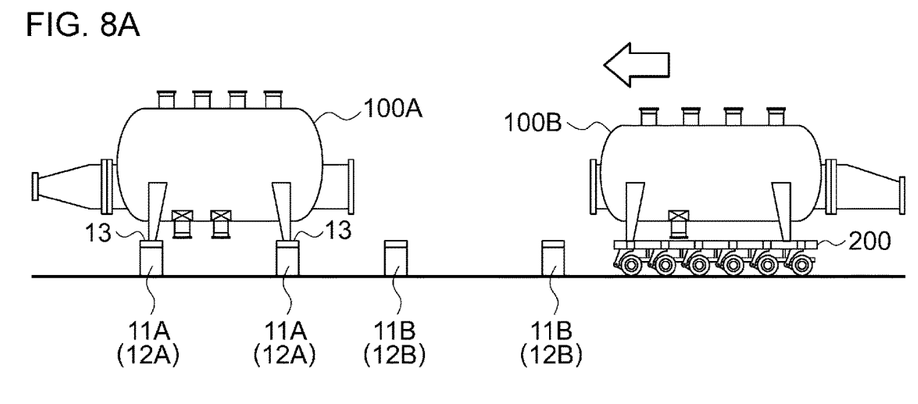
FIGS. 8A to 8C illustrate a fifth step of the method of installing the heat exchangers.
Figure 8B:
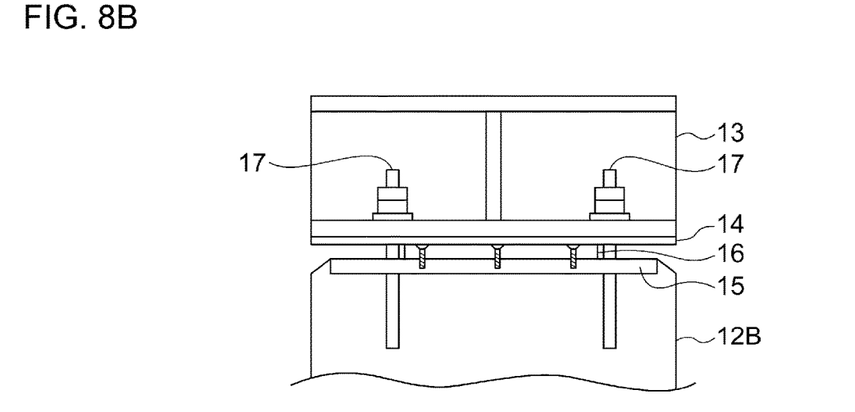
Figure 8C:
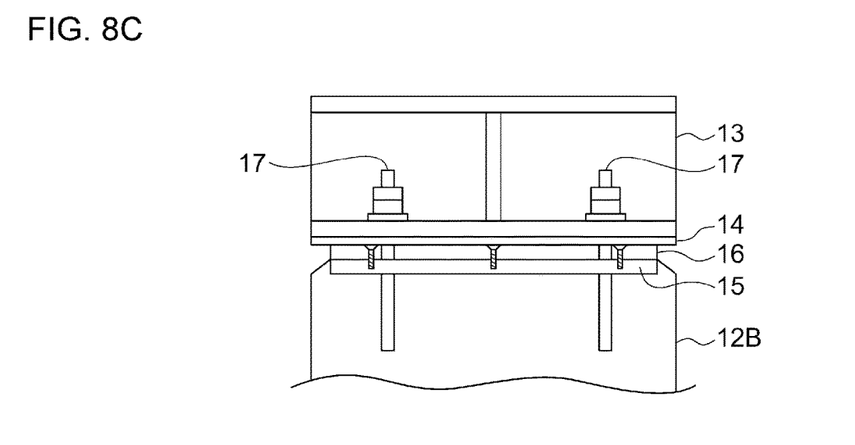

FIGS. 8A to 8C illustrate a fifth step of the method of installing the heat exchangers. FIG. 8A is a schematic side view illustrating the overall configuration in the fifth step. FIG. 8B is a front view of the second supporting structure 12B for the second heat exchanger in the fifth step, and FIG. 8C is a side view of the second supporting structure 12B for the second heat exchanger in the fifth step. In the fifth step, the transporter 200 loaded with the second heat exchanger 100B is caused to move to the predetermined installation position through the space between the first supporting structure 11B and the second supporting structure 12B.

Figure 9A:
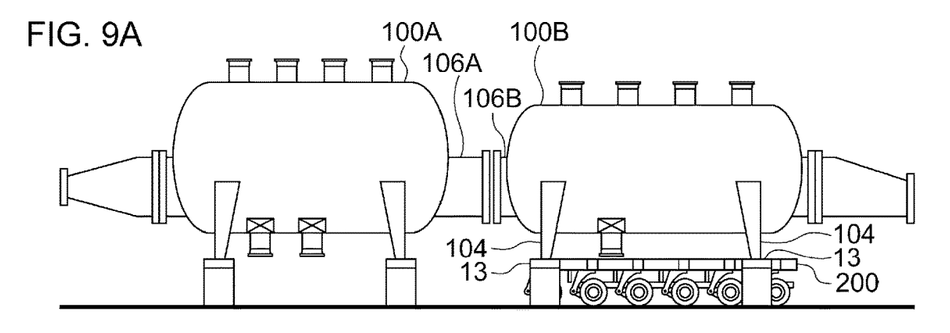
FIGS. 9A to 9C illustrate a sixth step of the method of installing the heat exchangers.
Figure 9B:
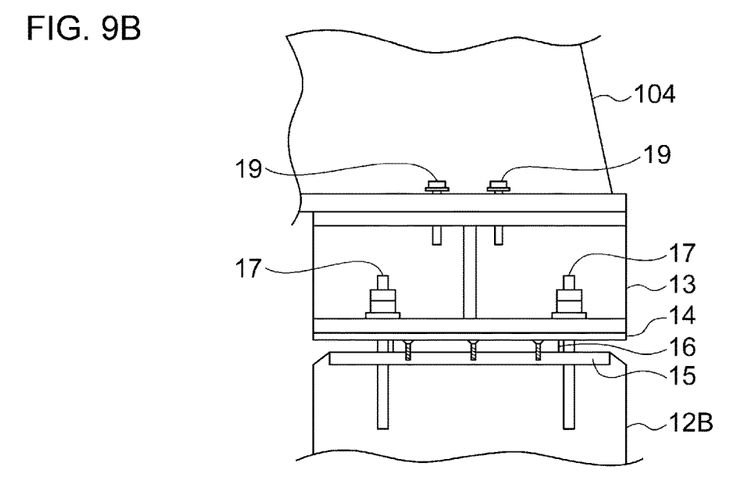
Figure 9C:
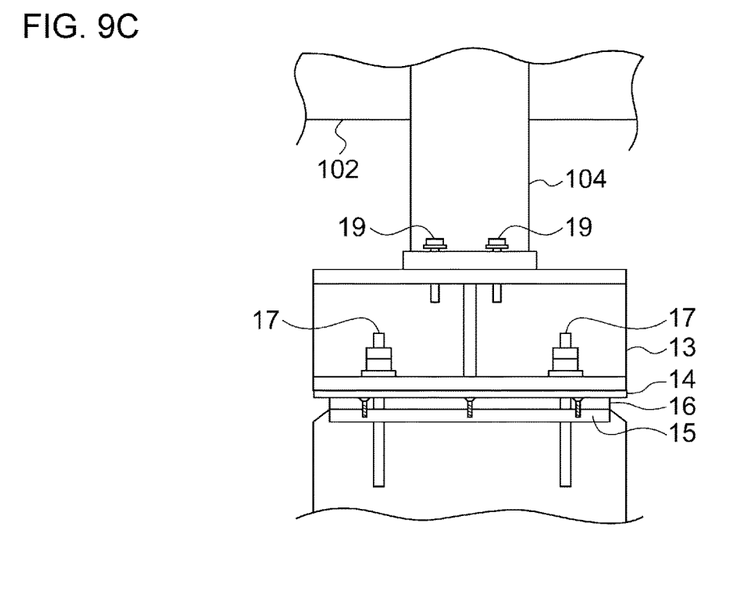

FIGS. 9A to 9C illustrate a sixth step of the method of installing the heat exchangers. FIG. 9A is a schematic side view illustrating the overall configuration in the sixth step. FIG. 9B is a front view of the second supporting structure 12B for the second heat exchanger in the sixth step, and FIG. 9C is a side view of the second supporting structure 12B for the second heat exchanger in the sixth step. In the sixth step, the position of the second heat exchanger 100B is adjusted by using the transporter 200 and the saddles 104 of the second heat exchanger 100B are placed on the interface members 13. Then, the setting bolts 19 are inserted into holes formed in the saddles 104 and the interface members 13. The setting bolts 19 are not fastened yet.

Figure 10:
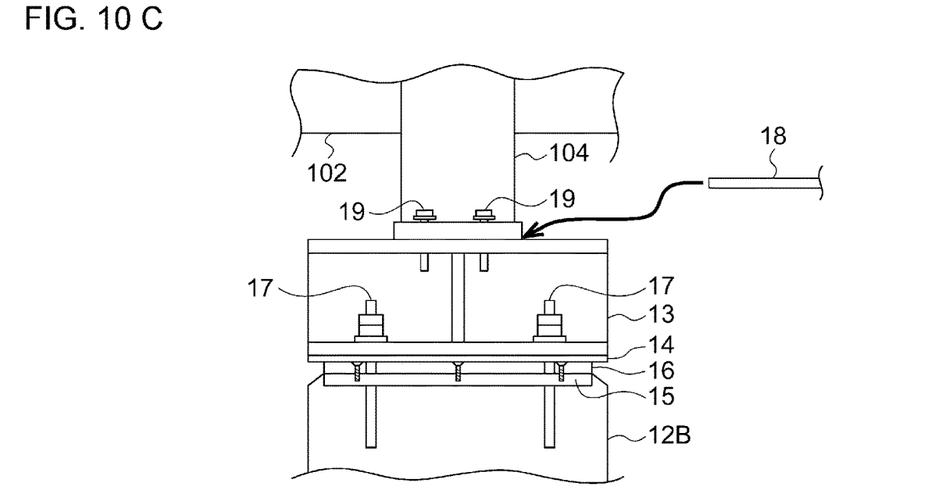
FIGS. 10A to 10C illustrate a seventh step of the method of installing the heat exchangers.
Figure 10A:
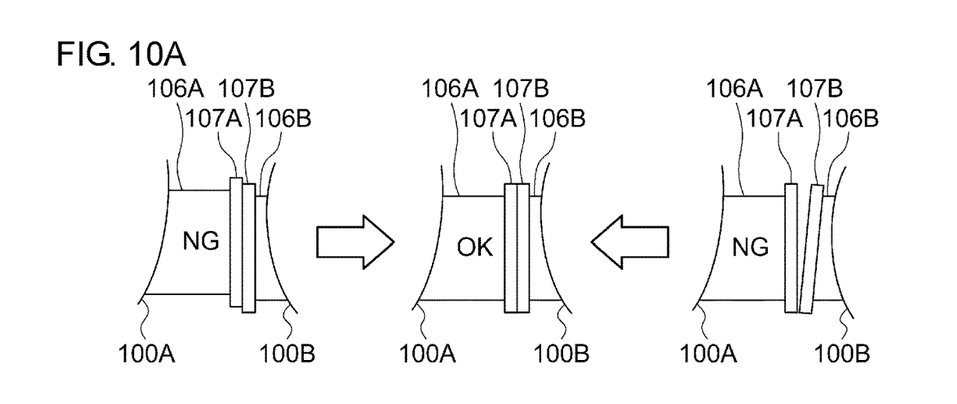
Figure 10B:
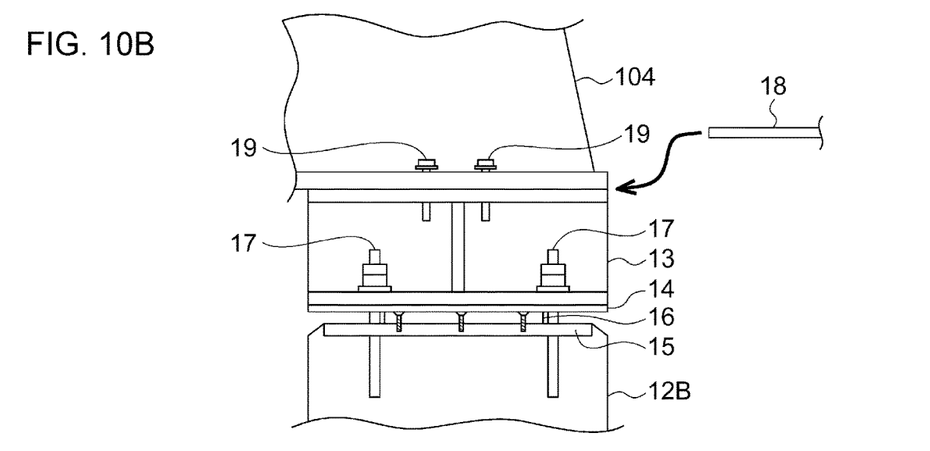

FIGS. 10A to 10C illustrate a seventh step of the method of installing the heat exchangers. FIG. 10A illustrates alignment of flanges in the seventh step. FIG. 10B is a front view of the second supporting structure 12B for the second heat exchanger in the seventh step, and FIG. 10C is a side view of the second supporting structure 12B for the second heat exchanger in the seventh step. In the seventh step, a flange 107A of a pipe 106A of the first heat exchanger 100A and a flange 107B of a pipe 106B of the second heat exchanger 100B are aligned by using the transporter 200. In this case, a shim plate 18 may be inserted between the saddles 104 and the interface members 13 such that the height of the flange 107A and the flange 107B match.

Figure 11A:
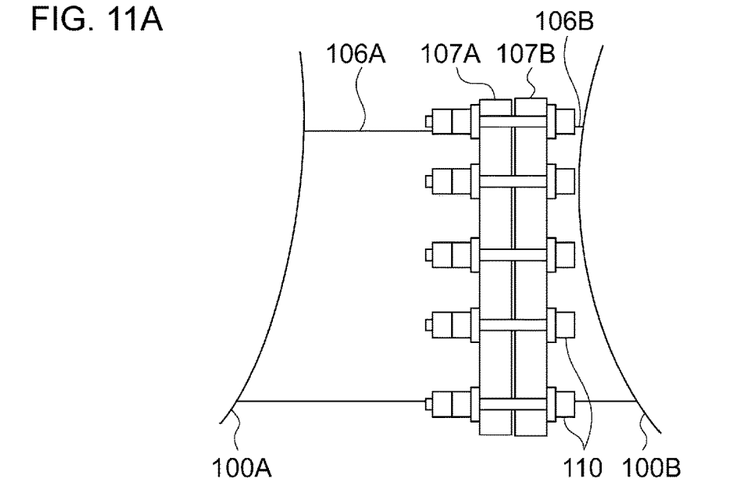
FIGS. 11A to 11C illustrate an eighth step of the method of installing the heat exchangers.
Figure 11B:
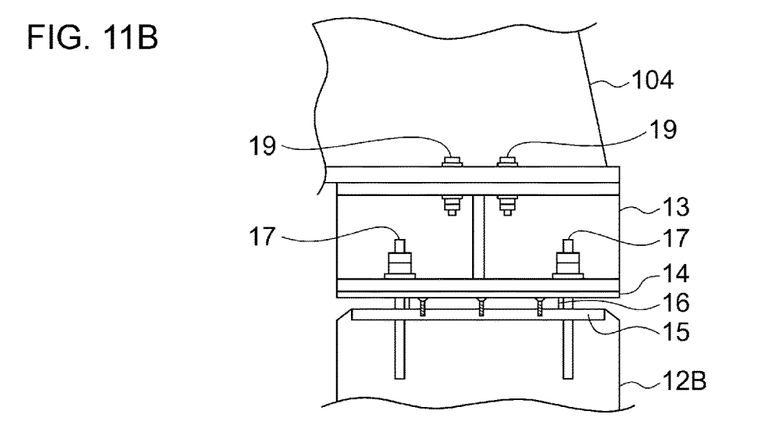
Figure 11C:
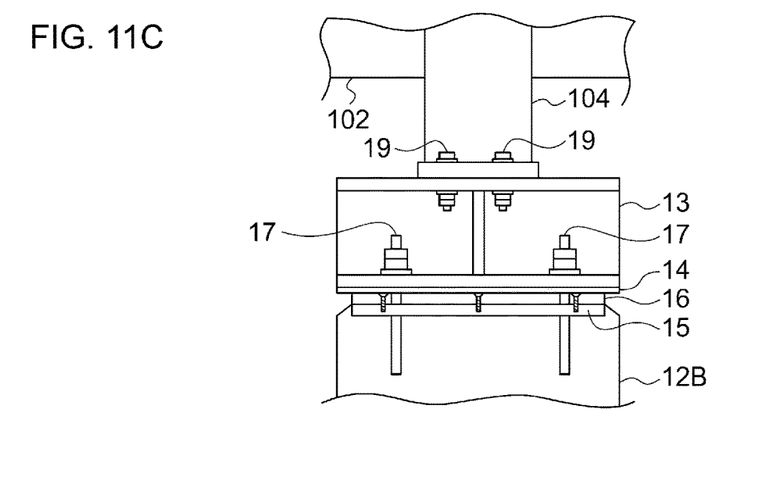

FIGS. 11A to 11C illustrate an eighth step of the method of installing the heat exchangers. FIG. 11A illustrates anchoring of the flanges in the eighth step. FIG. 11B is a front view of the second supporting structure 12B for the second heat exchanger in the eighth step, and FIG. 11C is a side view of the second supporting structure 12B for the second heat exchanger in the eighth step. In the eighth step, the flange 107A and the flange 107B that have been aligned are fastened by flange bolts 110. In addition, the setting bolts 19 are fastened to anchor the saddles 104 to the interface members 13. The installation and linkage of the first heat exchanger 100A and the second heat exchanger 100B are finished as described above. The transporter 200 is withdrawn after installing the heat exchangers. After withdrawal of the transporter 200, supporting members (for example, members made from steel or concrete) may be inserted under the saddles 104 to suppress vertical deflection of the saddles 104. The supporting members each may be disposed at the middle between the first supporting structure 11 and the second supporting structure 12.

As described above, according to the method of installing a heat exchanger using the supporting structure according to the present exemplary embodiment, the heat exchanger can be installed and the position thereof can be adjusted by using the transporter 200. Therefore, the installation can be finished more easily and in a shorter period of time than the conventional case where the heat exchanger is moved and the position thereof is adjusted by using a large crane, a hydraulic jack, a chain block, or the like. Moreover, the requirement of pulling up a large heat exchanger with a large crane is eliminated, and thus the installation can be improved also in terms of safety.

Although the case of installing a heat exchanger has been described above, the supporting structure according to the present exemplary embodiment is advantageous also in the case of inspecting the heat exchanger 100. In the case of inspecting the heat exchanger 100, the transporter 200 is first caused to move to be disposed under the heat exchanger 100 that is the target of the inspection through the space between the first supporting structure 11 and the second supporting structure 12. The heat exchanger 100 is then caused to move to another place by using the transporter 200, and the heat exchanger 100 is inspected. After finishing the inspection, using the transporter 200, the saddles 104 of the heat exchanger 100 are each placed on the interface members 13 of the first supporting structure 11 and the second supporting structure 12, and the position of the heat exchanger 100 is adjusted. After that, the saddles 104 are anchored to the interface members 13, and the inspection of the heat exchanger 100 is thereby finished.

In addition, the supporting structure according to the present exemplary embodiment is advantageous also in the case of inspecting a linkage between the first heat exchanger 100A and the second heat exchanger 100B. In the case of inspecting the linkage, the transporter 200 is first caused to move to be disposed under the first heat exchanger 100A through the space between the first supporting structure 11 and the second supporting structure 12. Next, the linkage between the first heat exchanger 100A and the second heat exchanger 100B is released. Then, the first heat exchanger 100A is moved away from the second heat exchanger 100B by using the transporter 200. Subsequently, a linkage element (for example, a flange) of each of the first heat exchanger 100A and the second heat exchanger 100B is inspected. After finishing the inspection, the first heat exchanger 100A is aligned with the second heat exchanger 100B by using the transporter 200, the first heat exchanger 100A and the second heat exchanger 100B are coupled, and the inspection of the linkage is thereby finished.

Figure 12:
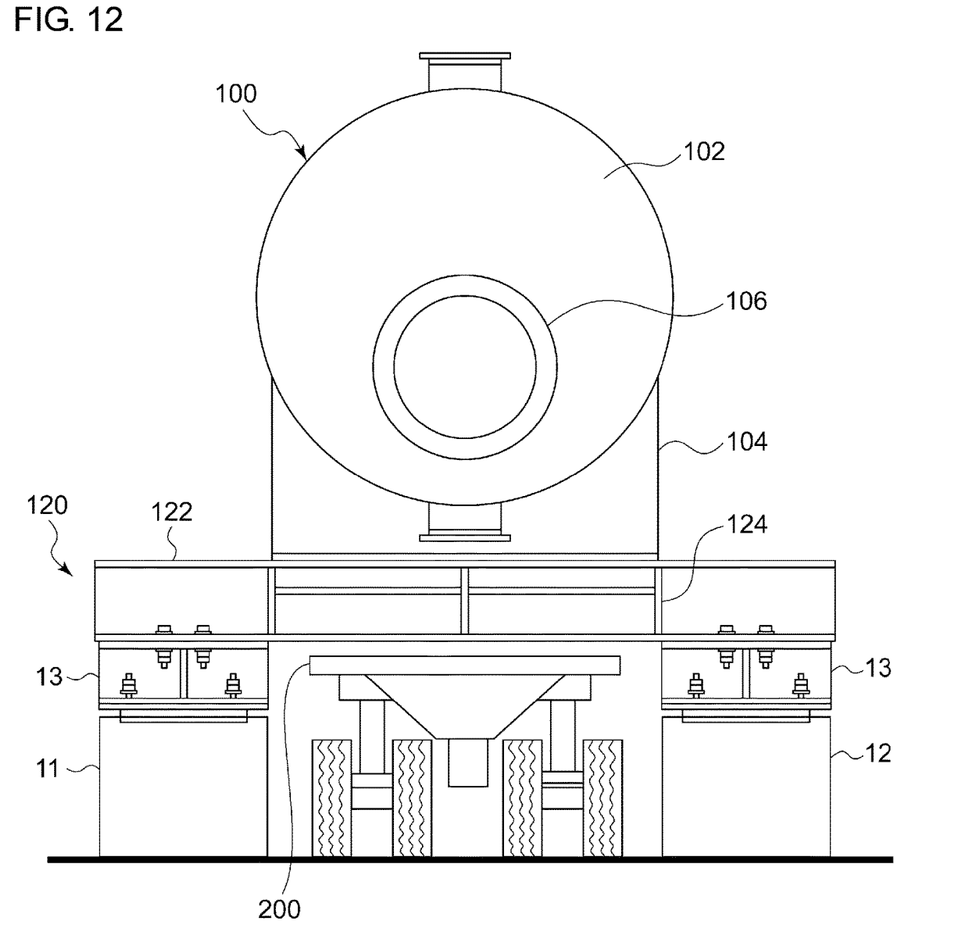
FIG. 12 is a schematic elevational view of a supporting structure according to another exemplary embodiment of the present invention.

Although a saddle having an approximately trapezoidal shape when seen from the front has been described as an example in the exemplary embodiment described above, the shape of the saddle is not particularly limited. FIG. 12 is a schematic elevational view of a supporting structure 120 according to another exemplary embodiment of the present invention. As illustrated in FIG. 12, in the case where the width of an existing saddle 104 is so short that the saddle 104 cannot be placed on the first supporting structure 11 and the second supporting structure 12, an elongation member (for example, a steel member) 122 that elongates the saddle 104 in the width direction may be attached to the saddle 104, and the elongation member 122 may be placed on the first supporting structure 11 and the second supporting structure 12 via the interface members 13 that are formed in a hollow box shape. The saddle 104 and the elongation member 122 may be anchored via welding or via bolts. In the case of an exemplary embodiment where the interface members 13 are not provided, the elongation member 122 may be placed directly on the first supporting structure 11 and the second supporting structure 12. In addition, the elongation member 122 may be provided with a reinforcement member 124 such as a stiffener and a rib plate to suppress local buckling or local deformation. After withdrawal of the transporter 200, a supporting member (for example, a member made from steel or concrete) may be inserted under the elongation member 122 to suppress vertical deflection of the elongation member 122. The supporting member may be disposed at, for example, the middle between the first supporting structure 11 and the second supporting structure 12.

The present invention has been described above on the basis of exemplary embodiments. One skilled in the art should understand that these embodiments are examples and various modifications of the combinations of the components thereof are possible, and that the modifications are also within the scope of the present invention.

For example, although a heat exchanger has been described as exemplary machinery to be supported by the supporting structure in the exemplary embodiments described above, the machinery to be supported is not particularly limited.

Moreover, although a transporter (SPMT) has been described as an exemplary conveyance means in the exemplary embodiments described above, the conveyance means is not particularly limited. The interval between the first supporting structure 11 and the second supporting structure 12 may be set in accordance with the dimension (particularly the width) of a conveyance means that is to be used.

What is claimed is:

1. A method of installing machinery having a saddle, the machinery installation method comprising:
   a step of situating a first supporting structure for supporting the saddle along one end thereof;
   a step of situating a second supporting structure for supporting the saddle along another end thereof, spaced apart from the first supporting structure by at least a distance enabling passage of a conveyance means for transporting the machinery;
   a step of causing the conveyance means, having been loaded with the machinery, to shift passing between the first supporting structure and the second supporting structure;
   a step of placing shim plate(s) on the first supporting structure and/or the second supporting structure in order to adjust the machinery height;

a step of setting, employing the conveyance means, the machinery saddle on the shim plate(s); and a step of anchoring the saddle to the first supporting structure and the second supporting structure.

2. A method of installing machinery having a saddle, the machinery installation method comprising:

a step of situating a first supporting structure for supporting the saddle along one end thereof;

a step of situating a second supporting structure for supporting the saddle along another end thereof, spaced apart from the first supporting structure by at least a distance enabling passage of a conveyance means for transporting the machinery;

a step of causing the conveyance means, having been loaded with the machinery, to shift passing between the first supporting structure and the second supporting structure;

a step of placing interface members on the first supporting structure and the second supporting structure;

a step of setting, using the conveyance means, the machinery saddle on the interface members; and a step of anchoring the saddle to the first supporting structure and the second supporting structure.

3. The machinery installation method according to claim 2, further comprising a step of anchoring, using fastening members, the interface members to the saddle.

4. The machinery installation method according to claim 2, further comprising a step of inserting between the saddle and the interface members a shim plate for adjusting the machinery height.

5. A method of inspecting machinery having a saddle, the machinery being supported by a first supporting structure supporting the saddle along one end thereof and by a second supporting structure supporting the saddle along another end thereof, the first supporting structure and the second supporting structure being situated spaced apart from each other by at least a distance enabling passage of a conveyance means enabled for adjusting machinery position, the machinery inspection method comprising:

a step of shifting the conveyance means to pass it between the first supporting structure and the second supporting structure and dispose it under the machinery;

a step of shifting the machinery, using the conveyance means;

a step of inspecting the machinery; and a step, post-inspection completion, of setting, using the conveyance means, the machinery saddle on the first supporting structure and the second supporting structure.

6. A method of inspecting linkages between first machinery and second machinery having saddles, the first machinery and the second machinery each supported by a first supporting structure supporting the saddle along one end thereof and by a second supporting structure supporting the saddle along another end thereof, the first supporting structure and the second supporting structure being situated spaced apart from each other by at least a distance enabling passage of a conveyance means enabled for adjusting machinery position, the linkage inspection method comprising:

a step of shifting the conveyance means to pass it between the first supporting structure and the second supporting structure and dispose it under the machinery;

a step of releasing the linkages between the first machinery and the second machinery;

a step of parting the first machinery away from the second machinery, using the conveyance means;

a step of inspecting respective linkage elements on the first machinery and the second machinery;

a step, post-inspection completion, of aligning the first machinery with respect to the second machinery, using the conveyance means; and a step of coupling the first machinery and the second machinery.

7. A supporting structure that supports machinery having a saddle, the supporting structure comprising:

a first supporting structure for supporting the saddle along one end thereof; and a second supporting structure for supporting the saddle along another end thereof; wherein the first supporting structure and the second supporting structure are situated spaced apart from each other by at least a distance enabling passage of a conveyance means for transporting the machinery.

* * * * *